(12) United States Patent
Garcia Morchon et al.

(10) Patent No.: US 10,327,136 B2
(45) Date of Patent: Jun. 18, 2019

(54) METHOD FOR DISTRIBUTED IDENTIFICATION, A STATION IN A NETWORK

(71) Applicant: KONINKLIJKE PHILIPS N.V., Eindhoven (NL)

(72) Inventors: Oscar Garcia Morchon, Aachen (DE); Bozena Erdmann, Aachen (DE); Josef Heribert Baldus, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/412,502

(22) Filed: Jan. 23, 2017

(65) Prior Publication Data
US 2017/0134942 A1    May 11, 2017

Related U.S. Application Data

(63) Continuation of application No. 12/936,534, filed as application No. PCT/IB2009/051527 on Apr. 10, 2009, now Pat. No. 9,553,726.

(30) Foreign Application Priority Data

Apr. 14, 2008    (EP) .................................. 08305102

(51) Int. Cl.
    *H04W 12/04*    (2009.01)
    *H04L 9/08*     (2006.01)
    (Continued)

(52) U.S. Cl.
    CPC ............. *H04W 12/04* (2013.01); *H04L 9/083* (2013.01); *H04L 9/321* (2013.01); *H04L 63/062* (2013.01);
    (Continued)

(58) Field of Classification Search
    CPC .. H04W 12/04; H04W 12/06; H04L 63/0823; H04L 9/321
    (Continued)

(56) References Cited

U.S. PATENT DOCUMENTS 4,309,569 A    1/1982    Merkle
5,987,129 A *  11/1999   Baba ..................... H04L 9/0847
                                                            380/279
(Continued)

FOREIGN PATENT DOCUMENTS

JP    2001237827 A    8/2001
JP    2004023796 A    1/2004
(Continued)

OTHER PUBLICATIONS

Blom, "An Optimal Class of Symmetric Key Generation Systems" Advances in Cryptology: Proc. EUROCRYPT'84, pp. 335-338, 1981.
(Continued)

*Primary Examiner* — Aravind K Moorthy
*Assistant Examiner* — Peiliang Pan

(57) ABSTRACT

The present invention relates to a method for identifying and/or, authenticating, and/or authorizing a first radio station in a radio network, comprising the steps of (a) at the first radio station, transmitting to a second radio station a first radio station identifier computed from a set of identity parameters based on the identity of the first radio station, comprising at least one identity parameter, (b) at the first radio station, transmitting at least one identity parameter from the set of identity parameters, (c) at the second radio station, comparing an authentication identifier computed on the basis of the transmitted identity
(Continued)

parameter to the first radio station identifier for enabling a subsequent communication between the first and second radio stations.

16 Claims, 5 Drawing Sheets

(51) Int. Cl.
    *H04L 9/32* (2006.01)
    *H04L 29/06* (2006.01)
    *H04W 12/06* (2009.01)
(52) U.S. Cl.
    CPC ......... *H04L 63/0823* (2013.01); *H04W 12/06* (2013.01); *H04L 2209/80* (2013.01)
(58) Field of Classification Search
    USPC ........................................................ 713/171
    See application file for complete search history.

(56) References Cited

U.S. PATENT DOCUMENTS

| | | | |
|---|---|---|---|
| 6,472,986 B1 | 10/2002 | Sorriaux | 340/571 |
| 6,788,788 B1* | 9/2004 | Kasahara | H04L 9/083 |
| | | | 380/277 |
| 6,802,002 B1 | 10/2004 | Corella | |
| 7,155,500 B2* | 12/2006 | Nikander | H04L 63/0823 |
| | | | 709/223 |
| RE40,334 E * | 5/2008 | Maillard | H04N 7/1675 |
| | | | 726/26 |
| 7,793,103 B2 | 9/2010 | Fu et al. | 713/171 |
| 8,005,225 B2* | 8/2011 | Kim | H04L 9/0822 |
| | | | 380/277 |
| 8,019,988 B2 | 9/2011 | Li | 713/150 |
| 2001/0032310 A1* | 10/2001 | Corella | H04L 9/002 |
| | | | 713/156 |
| 2001/0032314 A1 | 10/2001 | Ansper et al. | 713/176 |
| 2002/0004900 A1* | 1/2002 | Patel | G06Q 30/02 |
| | | | 713/155 |
| 2003/0028585 A1* | 2/2003 | Yeager | G06F 9/4416 |
| | | | 709/201 |
| 2003/0133576 A1* | 7/2003 | Grumiaux | H04L 9/0866 |
| | | | 380/279 |
| 2003/0149781 A1 | 8/2003 | Yared | G06F 21/41 |
| | | | 709/229 |
| 2003/911849 | 11/2003 | Kempf | H04L 9/0825 |
| | | | 455/411 |
| 2003/0233542 A1 | 12/2003 | Benaloh | |
| 2005/0010680 A1* | 1/2005 | Zick | H04L 63/0853 |
| | | | 709/237 |
| 2006/0048233 A1* | 3/2006 | Buttross | G07C 9/00023 |
| | | | 726/27 |
| 2006/0161816 A1 | 7/2006 | Gula | H04L 41/065 |
| | | | 714/39 |
| 2006/0240802 A1* | 10/2006 | Venkitaraman | H04L 63/067 |
| | | | 455/411 |
| 2007/0067403 A1* | 3/2007 | Holmes | H04L 67/26 |
| | | | 709/206 |
| 2007/0279227 A1 | 12/2007 | Juels | 340/572.1 |
| 2008/0075067 A1* | 3/2008 | Guglielmi | H04W 76/14 |
| | | | 370/352 |
| 2008/0098213 A1 | 4/2008 | Kevenaar et al. | 713/156 |
| 2008/0137856 A1* | 6/2008 | Ja Beom | G06F 21/33 |
| | | | 380/255 |
| 2008/0178004 A1* | 7/2008 | Wei | H04L 63/0869 |
| | | | 713/171 |
| 2008/0267407 A1* | 10/2008 | Vanderveen | H04L 9/083 |
| | | | 380/277 |
| 2008/0313716 A1* | 12/2008 | Park | H04L 63/104 |
| | | | 726/4 |
| 2009/0019284 A1 | 1/2009 | Cho | |
| 2009/0100165 A1* | 4/2009 | Wesley, Sr. | G06F 15/173 |
| | | | 709/223 |
| 2009/0167535 A1 | 7/2009 | Sanchez et al. | |
| 2009/0238363 A1* | 9/2009 | Tronel | H04L 9/0836 |
| | | | 380/239 |
| 2009/0259847 A1 | 10/2009 | Li | 713/168 |
| 2010/0098253 A1* | 4/2010 | Delerablee | H04L 9/3073 |
| | | | 380/259 |
| 2015/0301996 A1 | 10/2015 | Hinterbichler | G06F 11/3656 |
| | | | 715/230 |
| 2017/0134942 A1* | 5/2017 | Garcia Morchon | H04W 12/04 |

FOREIGN PATENT DOCUMENTS

| | | |
|---|---|---|
| WO | 2006006124 A1 | 1/2006 |
| WO | 2006035400 A1 | 4/2006 |
| WO | 2007149850 A2 | 12/2007 |

OTHER PUBLICATIONS

Blundo et al, "Perfectly-Secure Key Distribution for Dynamic Conferences", Proc. Conf. Advances in Cryptology (CRYPTO'92), E.F. Brickell, Ed., pp. 471-486, 1992.

Merkle, "Secrecy, Authentication and Public Key Systems" Ph.D Dissertation, 193 Pages, 1979.

Johnson et al, "Homomorphic Signature Schemes" LNCS 2271, pp. 244-262.

"A Deterministic Pairwise Key Pre-distribution Scheme for Mobile Sensor Networks", Sanchez et al., 2005, IEEE.

"Handbook of Applied Cryptolography"; Menezes, Oorschot, Vanstone, Editors, Chapter 11: "Digital Signatures"; CRC Press, 1996, pp. 425-488.

* cited by examiner

METHOD FOR DISTRIBUTED IDENTIFICATION, A STATION IN A NETWORK

CROSS-REFERENCE TO PRIOR APPLICATIONS

This application claims the benefit or priority of and describes relationships between the following applications: wherein this application is a continuation of U.S. patent application Ser. No. 12/936,534, filed Oct. 6, 2010, which is the National Stage of International Application No. PCT/IB2009/051527, filed Apr. 10, 2009, which claims the priority of foreign application EP08305102 filed Apr. 14, 2008, all of which are incorporated herein in whole by reference.

FIELD OF THE INVENTION

The present invention relates to a method to identificate, authenticate, and authorize a station in a network, and to a radio station therefore.

This invention is, for example, relevant for a wireless network comprising low power or low complexity radio nodes like a Zigbee network.

BACKGROUND OF THE INVENTION

Conventional Wireless sensor networks (WSNs) comprise wireless sensor and actuator nodes that wirelessly communicate with each other enabling different applications such as pervasive healthcare or smart lighting environments. For instance, a medical sensor network (MSN) is a wireless sensor network where patients are equipped with wireless medical sensors (WMSs) that measure, process and forward users' vital signs in real time. Clinical staff can monitor patient's vital signs by means of, e.g., PDAs or bedside monitors.

In this particular context, the provision of basic security services such as entity identification, authentication and access control to wireless sensor networks are essential. Indeed, such a network must be robust and secure enough to prevent attackers from gaining control over the network. General data protection policies such as the European directive 95/46 or healthcare rules such as HIPAA in the United States must be taken into account when designing security systems for MSNs. For instance, only authorized doctors should be able to monitor patient's vital signs.

To enable the network to be robust, the distribution of encryption keys is crucial. These encryption keys are used to establish a secure connection between two nodes, avoiding thus eavesdropping. Thus, key distribution among the nodes is the security's cornerstone as it defines how to distribute the cryptographic keys used to enable those security services. However, the efficient provision of both key distribution and security services is challenging due to the resource-constrained nature of wireless sensor nodes as WMSs in MSNs.

α-secure key distribution schemes (KDSs) have been identified as a feasible and efficient option for key distribution and key agreement in wireless sensor networks such as medical sensor networks (MSN). Here, a designates the security level of the network. These schemes offer a trade-off between scalability, resilience, connectivity, and computational overhead. In aα-secure KDSs, nodes do not share ready-made keys. Instead, nodes are provided with some node-specific information that allows them to compute a shared key with any other node in this security domain on input of that node's identifier. This node-specific information is derived from a keying material root ($KM^{Root}$) and the node-specific keying material share for node i is denoted by $KM^{(i)}$. Hence, the different keying material shares $KM^{(i)}$ are all different but correlated. This approach is especially interesting for mobile wireless sensor and actuator networks due to different reasons including: (i) its efficiency on resource-constrained wireless sensor nodes; (ii) its feasibility in mobile scenarios such as patient monitoring or wireless control networks addressed by the ZigBee Alliance where both scalability and distributed operation are key features.

However, current state-of-the-art does not specify how to allow for efficient identification and authentication of a node, for instance concerning the aspects entity identification and access control based on α-secure key distribution schemes, and thus, new techniques addressing these problems are required.

Typically, the provision of these security services can be carried out either in a centralized or distributed fashion. When centralized, a central trust center controlling the network security keeps a list of the different entities in the network, their digital identities, and access control rights. When a party A requests a communication with B, both parties rely on the central trust center (TC) to authenticate both parties. The use of a central TC is not convenient for wireless sensor networks as it requires the presence of an online TC, and requires a high amount of communication towards the Trust Center, overloading the Trust Center etc. This is not possible for a resource constrained network like a Zigbee network.

Distributed identification and access control is more adequate for wireless sensor networks, such as MSNs, as it fits their operational requirements: efficiency, minimum delay, no single point of failure. However, usually distributed identification and access control is based on digital certificates and an underlying public-key infrastructure (PM) based on public key cryptography (PKC); based on various mathematically hard problems (e.g., the integer factorization problem, the RSA problem, the Diffie-Hellman problem or discrete logarithm problem). However, the use of public key cryptography is computationally too expensive for resource-constrained devices such as PDAs or wireless sensor nodes used in this kind of network.

SUMMARY OF THE INVENTION

It is an object of the invention to propose a distributed security method for identification, authentication, and authorization that can be implemented on resource constrained network.

Another object of the invention is to provide a robust identification, authentication and authorization method for a wireless network as a Zigbee network.

Still another object of the invention is to provide a radio station the ability of identing and authenticating information to other radio stations.

Another object of the invention is to provide a method to identify and authenticate the information in a privacy aware fashion.

Another object of the invention is to provide a radio station the capability of identifying and authenticating the information of other radio stations, and granting access depending upon the authenticated information.

Another object of the invention is to allow for the above functionalities in a distributed fashion.

To this end, according to a first aspect of the invention, it is described a system offering efficient and distributed key agreement, access control and privacy-aware identification. Therefore, the techniques described in this invention overcome the problems of distributed entity identification, authentication and authorization in wireless sensor networks without requiring the use of expensive public key cryptography or a centralized trust center.

In accordance to a second aspect of the invention, it is proposed to link the keying material such as alpha-secure keying material carried by a device to the identification information held by the device in a cryptographic way.

In accordance to a third aspect of the invention, it is proposed to use the keying material to authenticate the information held by a device.

In accordance to a fourth aspect of the invention, the information held by a device consists of the digital identity and access control roles.

In accordance to still another aspect of the invention, the information can be authenticated in a privacy-aware fashion by means of a tree structure.

According to another aspect of the invention, it is proposed to use the information held by a device and linked to the keying material to allow for distributed authentication of the information, privacy-aware identification and distributed access control.

According to another aspect of the invention, it is proposed a method for identifying, and/or, authenticating, and/or authorizing a first radio station in a radio network, comprising the steps of
  (a) at the first radio station, transmitting to a second radio station a first radio station identifier computed from a set of identity parameters based on information linked to the first radio station,
  (b) at the first radio station, transmitting at least one identity parameter from the set of identity parameters,
  (c) at the second radio station, comparing an authentication identifier computed on the basis of the transmitted identity parameter with the first radio station identifier for enabling a subsequent communication between the first and second radio stations These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for identifying, authenticating, and authorizing a station in a network comprising a plurality of radio networks.

The present invention is more especially dedicated to a low power, low complexity radio network, as for instance a Zigbee network.

Figure 1:
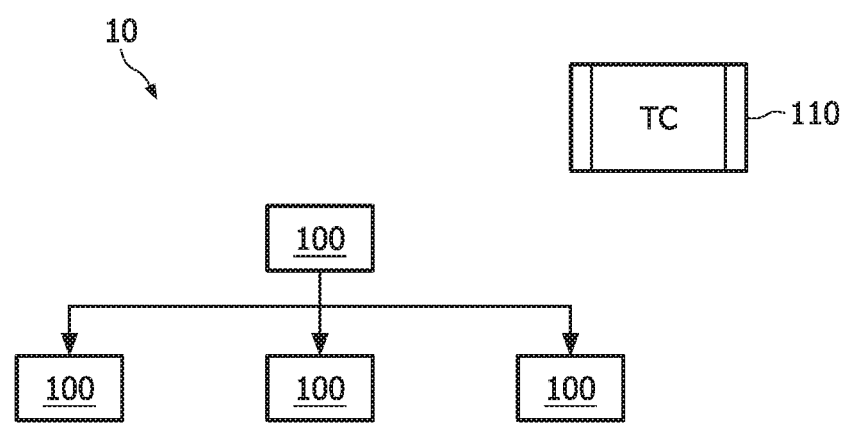
FIG. 1 is a block diagram of a network in which the method in accordance with a first embodiment of the invention.

As depicted on FIG. 1, a wireless network 10 comprises a plurality of radio stations 100 connected to each other by means of wireless connections in this example. However, it is to be noted that the invention could be implemented in a wired network. In the example of a low cost network, the radio stations 100 are resource constrained.

For instance, a radio station 100 may be a PDA or mobile phone. In order to manage and authorize the radio stations to create secure connections, a Trust Center 110 is provided. This Trust Center is a particular device which is able to check whether a radio device requesting access to the network 10, and to provide to this new radio device with some keying material that the node can use afterwards to identificate and authenticate itself, agree on a common key with other nodes, and prove the possession of information, e.g., digital identity or access control roles.

Figure 2:
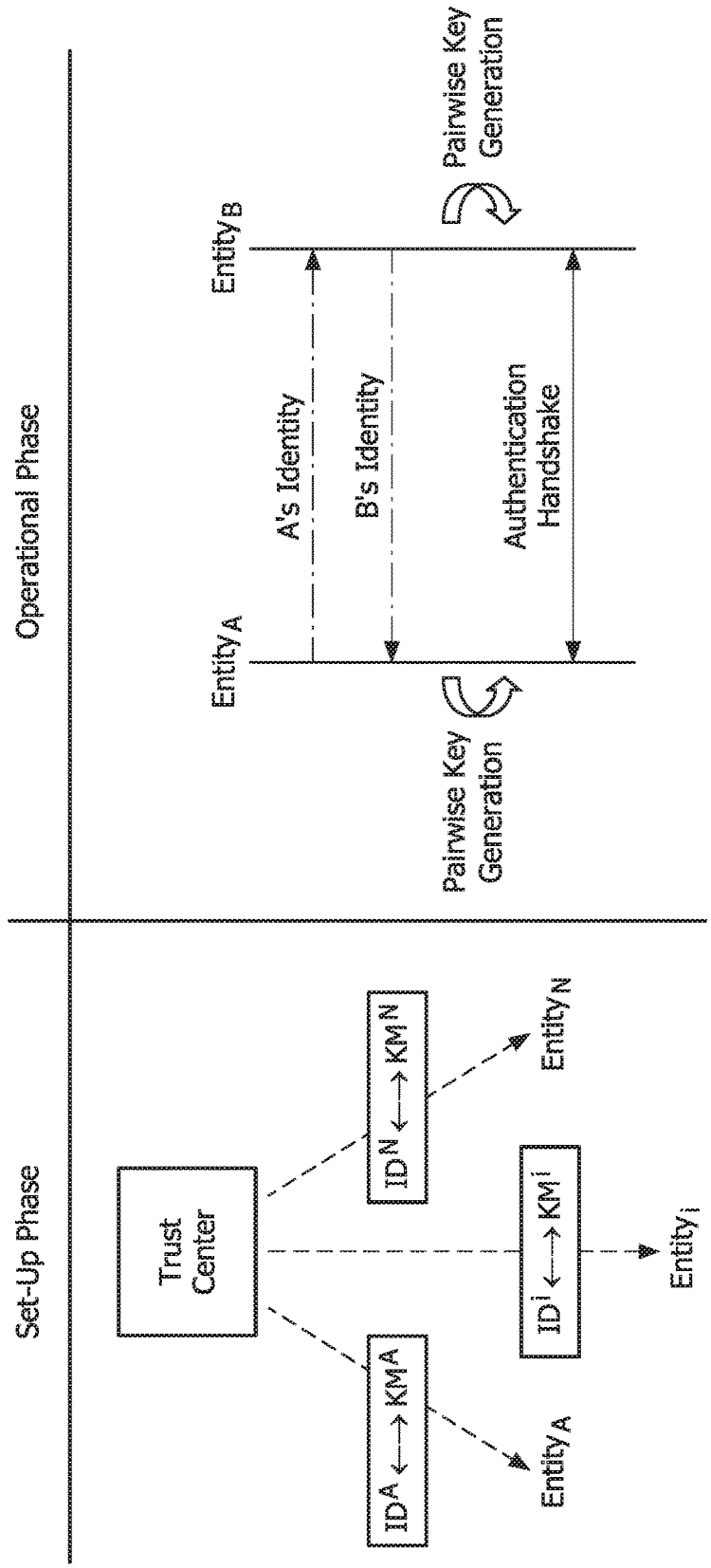
FIG. 2 is a diagram illustrating the operation of an α-secure Key distribution scheme in a network.

As an example, the network uses an α-secure KDS, whose operation is illustrated in FIG. 2. During a first phase of initialization or set-up phase, the trust center 110 (TC) generates a root keying material $(KM^{root})$ From $KM^{root}$, the TC 110 generates a different (but correlated) keying material share, $KM^{(i)}$, for each and every node or radio station 100, i, in the security domain, with i=1, . . . ,N. Afterwards, the TC 110 distributes a set of keying material share to each node 100. In general, a node 100 carrying a keying material share, KM(i), is identified by IDi. Typically, the $KM^{root}$ may be a symmetric bivariate polynomial f(x,y) of degree a over a finite field $F_q$ with q large enough to accommodate a cryptographic key. Given f(x,y), a TC 110 can generate up to q different keying material shares by evaluating f(x,y) in different values of the x variable with $1 \le x \le q$, i.e., KM(i)=f (i,y) and ID(i)=i. Note that other α-secure KDS can be used in order to minimize the computational requirements of the system.

In the second, operational phase, any pair of arbitrary nodes 100 in this security domain, A and B, can exploit the pre-distributed keying material shares to agree on a common key in a distributed fashion, i.e. without further TC involvement. To this end, both nodes 100 obtain the identity of the peer by exchanging them, as part of a binding process or the like. Afterwards, they use their respective keying material shares in combination with the identities to generate a pairwise key.

For instance, we can assume again that a symmetric bivariate polynomial f(x,y) is used as root keying material, and nodes A and B carry the keying material shares f(A,y) and f(B,y) respectively. Firstly, both parties obtain their corresponding identities, i.e., radio station B obtains A's identifier $ID_A$=A, and radio station A obtains B's identifier $ID_B$=B. Then, each radio station can generate a common key in a distributed manner by evaluating its polynomial share in the identity of the other radio station, i.e., node A evaluates its polynomial share f(A,y) in y=B and node B evaluates f(B,y) in y=A. Therefore, both nodes agree on a common key K=f(A,B)=f(B,A). Finally, both nodes can use K to authenticate to each other by means of, e.g., a challenge-response authentication handshake, or derive a session key to enable confidentiality, e.g., by means of a one-way hash function.

In accordance with an aspect of this invention, different techniques are described to enable distributed entity identification, authentication and authorization based on key distribution schemes, for instance α-secure key distribution schemes. These techniques allow for:

The creation of a lightweight digital certificate that can be linked to the identifier of a α-secure keying material share carried by an entity. This makes possible the authentication of information stored on the lightweight digital certificate in an efficient way.

The creation of a privacy-aware lightweight digital certificate that can be linked to the identifier of an α-secure keying material share carried by an entity. This makes possible the identification and authentication of discrete attributes of entities' digital identities.

Privacy-aware techniques to protect entities' digital identities stored in α-secure digital certificates.

Distributed access control (AC) based on AC roles stored in the α-secure digital certificates and AC policies/rules.

Improving current identity-based cryptosystems based on public key cryptography by applying the techniques described in this ID for α-secure KDS (digital certificates and distributed access control) to those schemes.

Scalable, no single point of failure, computationally affordable/tailored for WSNs/MSNs The detailed description of the invention is structured as follows. Firstly, we recapitulate the basics of α-secure KDSs including operation and the basic techniques. Then, we describe how to generate a digital certificate for α-secure KDSs and use it in combination with α-secure KDSs. Two different types of certificates are described:

a. In accordance with a first embodiment, a lightweight α-secure certificate used to authenticate the whole digital identity of an entity.

b. In accordance with a second embodiment, a privacy-aware α-secure certificate used to authenticate discrete features of an entity's digital entity.

In accordance with the described system, an α-secure KDS (as described above) enables efficient key agreement and authentication in, e.g., wireless sensor networks. However, it is very difficult to securely link a simple identifier or number to the digital identity of an entity. It is therefore also challenging to enable access control in these systems.

This first embodiment overcomes these issues by creating an α-secure digital certificate which can be authenticated/verified by means of the keying material share that an entity in a security domain, e.g., a network, carries. To better understand this fact note that an α-secure KDS allows an entity in the system to (i) authenticate itself as a member of the security domain (by possession of the Keying material), and (ii) prove that identifier ID(i) the node claims is linked to KM share, KM(i), it carries.

The system described in section 1, and depicted in FIG. 1 can be extended to create and make use of lightweight α-secure digital certificates. These digital certificates can be used to authenticate the whole digital identity of an entity (e.g., comprising a set of features such as name, location, profession/type, roles, etc. in the case of a human user) and enable distributed access control. Such a system can be created by taking into account the following points and integrating them into the general operation of FIG. 2.

i. Given the digital identity of a radio station i comprising a set of identity parameters composed of M different attributes, i.e., i's Digital Identity={attr. 1, attr. 2, attr. 3, . . . , attr. M}, the ID(i) of i is defined as the hash of i's digital identity ID(i), i.e.,:

$$ID(i)=hash(attr.\ 1\|\ attr.\ 2\|\ attr.\ 3\|\ldots\|\ attr.\ M)$$

Figure 3:
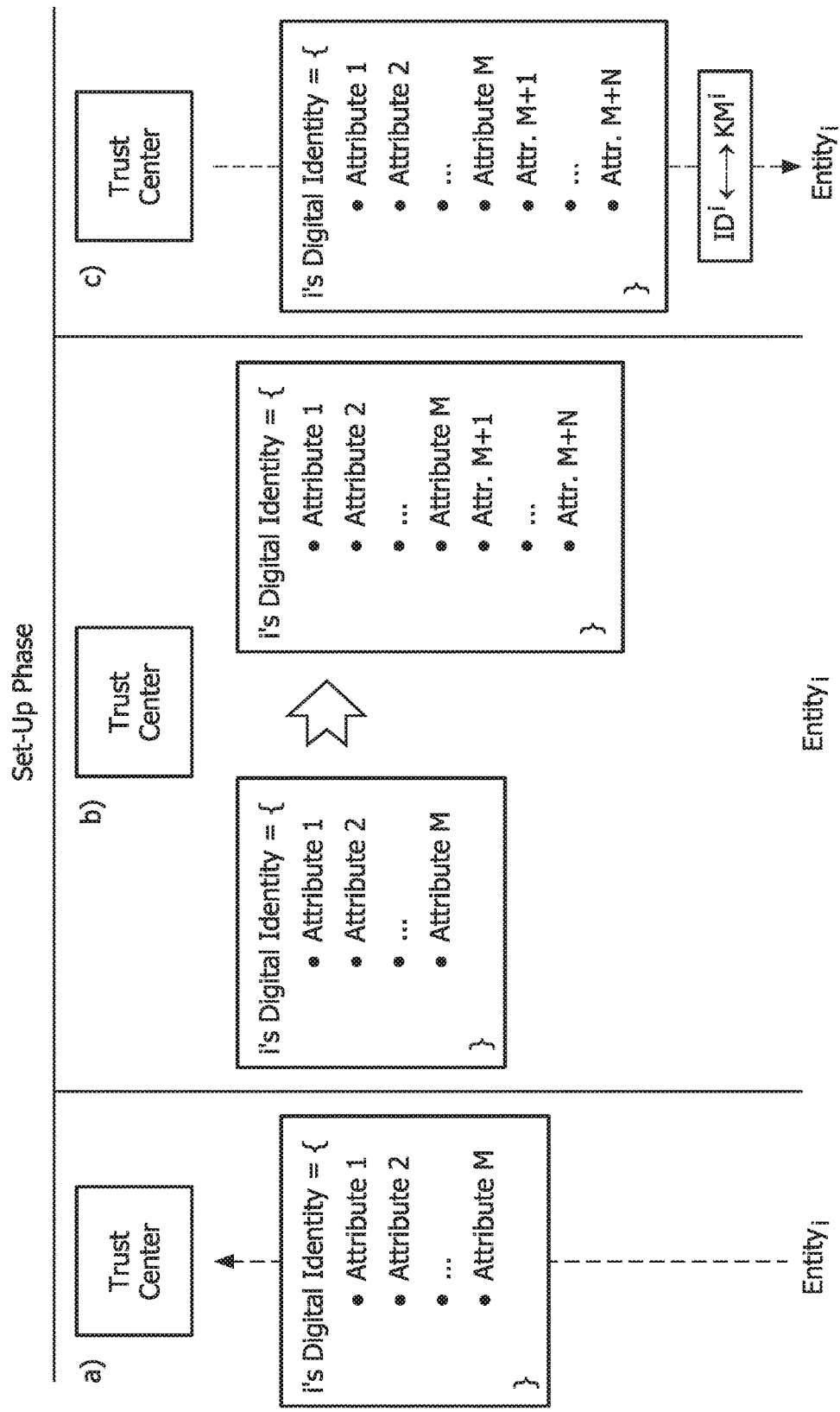
FIG. 3 is a diagram of illustrating an α-secure Key distribution scheme in accordance with the first embodiment of the invention.

As an example, the attributes of the radio station i are concatenated in a single codeword. Then, a hash function is applied over the concatenated attributes to generate the identifier of the radio station i.

ii. On FIG. 3 is depicted a method of creation of the identifier, and the keying material share in a second step. The Trust Centre (TC) uses the $KM^{root}$ to generate and assign a keying material share linked to ID(i) for each entity i in the security domain. Firstly, entity i securely sends several attributes of its digital identity to the TC (step a). Then, the TC verifies the validity of this information, e.g., by using i's credentials sent out of band. The TC can also combine the digital identity received from i with n other parameters such as access control roles or expiration date, etc (step b). Then, TC generates ID(i) for i as described in above. Finally, the TC uses the KMroot to create a KM share, KM(i) for i linked to ID(i). The TC sends KMroot , ID(i), and the whole digital identity (including new attributes such as AC roles and the format used to calculate ID(i)) to i in a secure way (step c).

iii. Finally, if a pair of devices A and B needs to establish a secure communication with each other both devices exchange their digital identities, calculate the hash of the digital identity of the other party, and carry out an authentication handshake as explained in section 1. Another embodiment of this handshake is as follows. A and B firstly agrees on a common key based on their identities ID_A and ID_B. Once a secure channel between them has been established, both entities exchange their digital identities. An entity can prove the validity of the digital identity of the other party by hashing it and comparing the result with the identifier IDB that was used to agree on a common key.

A successful authentication handshake implies that both parties carry keying material shares for the α-secure security domain, and thus the claimed IDs were genuine, and thus the exchanged digital identities were genuine, as well.

In a second embodiment of the invention, it is proposed to improve the first embodiment method, by providing Privacy-aware α-secure Digital Certificates.

The solution described in the previous embodiment allows for lightweight α-secure digital certificates. However, it also presents some drawbacks. Firstly, it requires disclosing the whole digital identity which can be inconvenient in privacy-aware systems. Secondly, digital identities are disclosed without confidentiality protection, so that any passive attacker can eavesdrop on the communication and gain valuable information about the digital identity of a device or person.

In this embodiment, we present a privacy-aware α-secure digital certificate that overcomes these issues.

i. Privacy-aware α-secure Digital Certificate Creation

Figure 4:
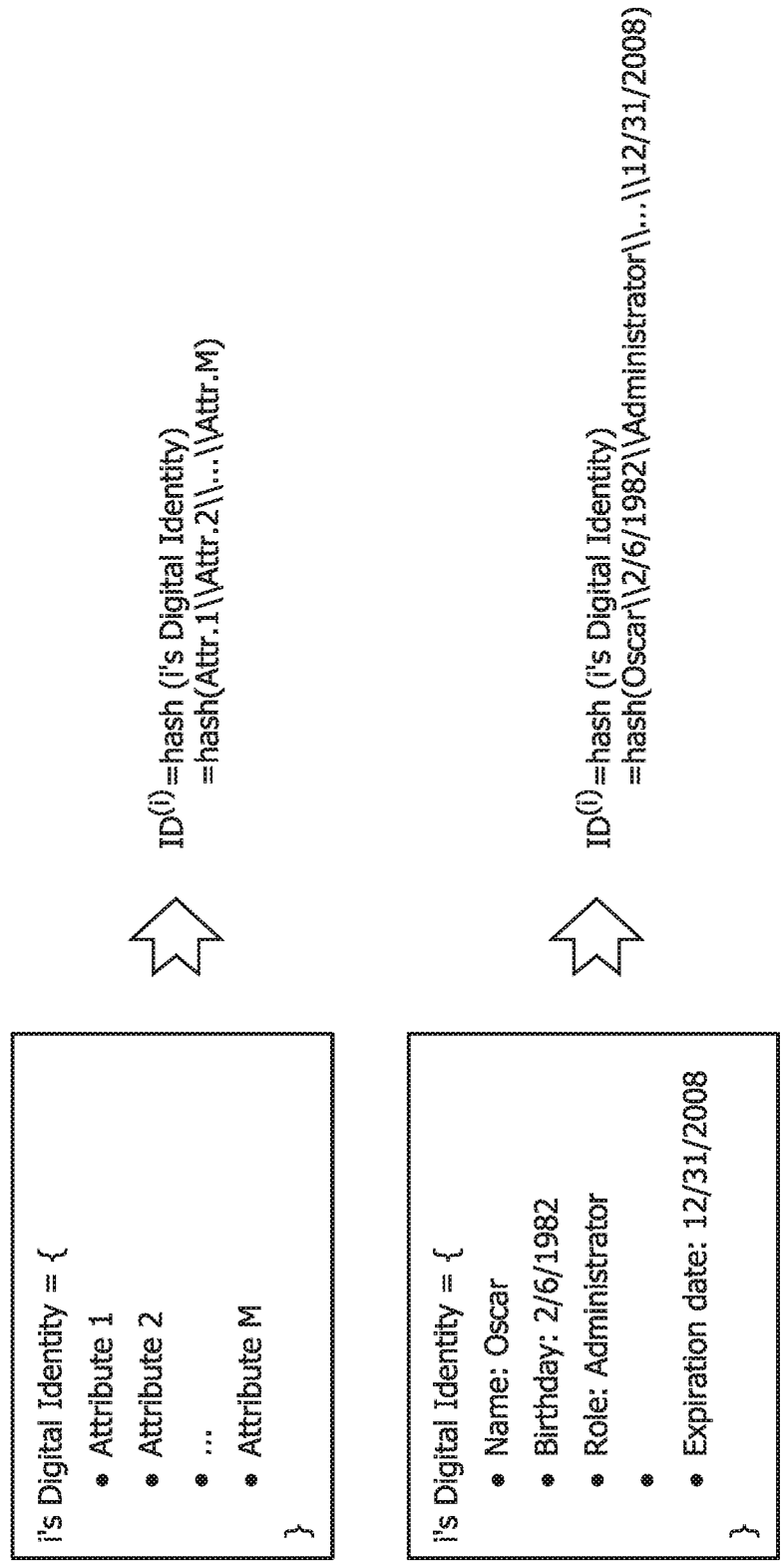
FIG. 4 is a diagram illustrating the generation of an identifier in accordance with a second embodiment.

To create a privacy-aware α-secure digital certificate for an entity's digital identity , we take all the M attributes that comprise the entity's digital identity to build a binary Merkle tree: a hash of a pair of hashed attributes of i's digital identity is hashed further, to obtain the root hash of a Merkle tree, used as ID(i). FIG. 4 depicts this process for a general and specific case (see FIG. 4—top and bottom—respectively).

Note: Attackers may be prevented from finding collisions in the hash output of trivial, short attributes such as dates or names. For instance, knowing y=h(date) where h( )is a defined hash function, it is straightforward to find out date by means of a dictionary-based attack. This problem can be avoided by concatenating each of the attributes in i's digital identity to a different random number long enough, i.e., in the example, by calculating the output as y=h (nonce∥date). Observe that attribute verification requires the disclosure of both the attribute and the nonce.

ii. The second step, Digital certificate distribution, is identical to the process described in the first embodiment above and depicted in FIG. 3.

iii. Secure communication establishment

Figure 5:
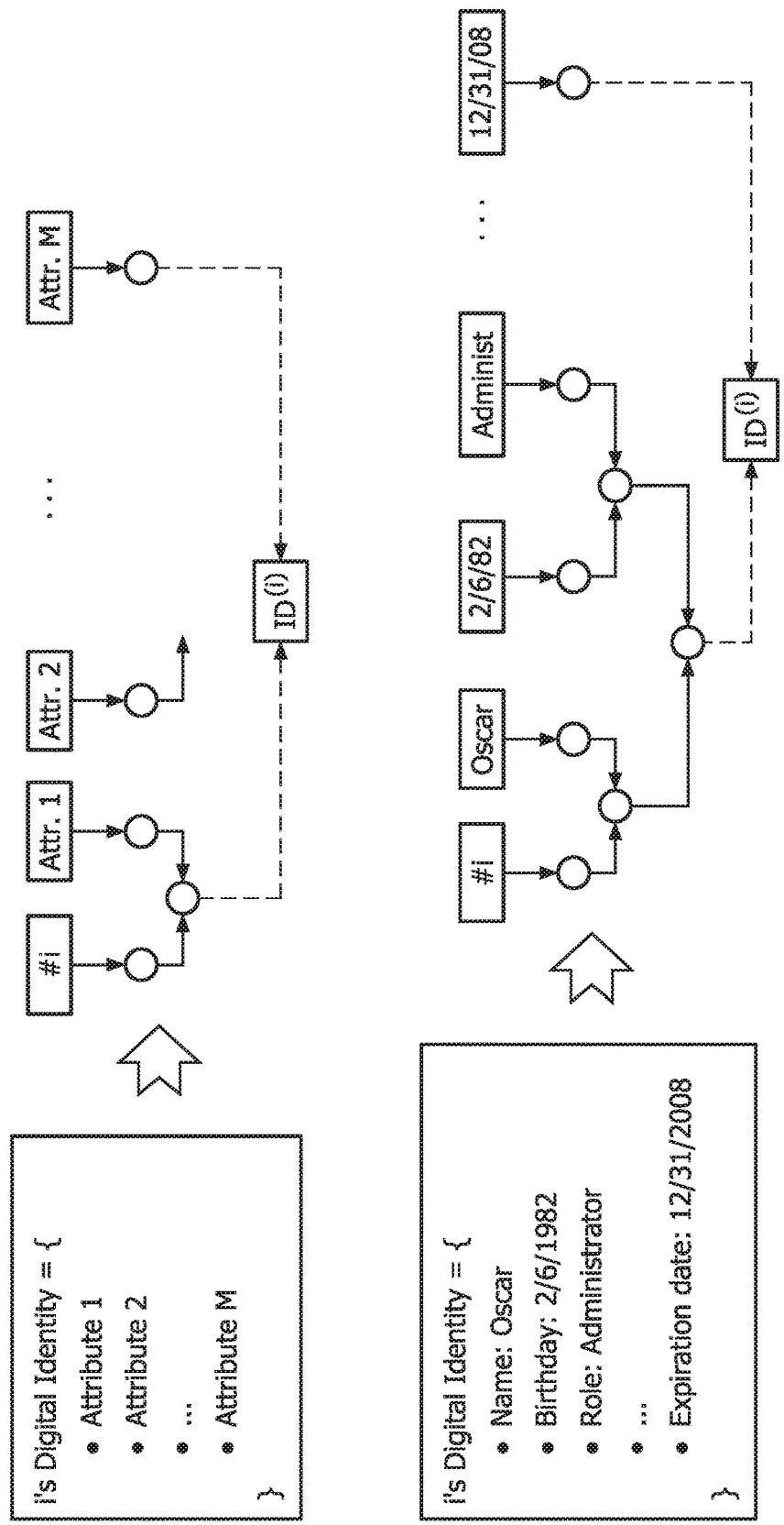
FIG. 5 is a diagram of illustrating an α-secure Key distribution scheme in accordance with the second embodiment of the invention.

When a pair of devices A and B needs to establish a secure communication including key agreement, authentication, entity identification, and/or authorization in a privacy-aware fashion, they follow the flowchart depicted in FIG. 5.

Step i—identity exchange: both entities A and B exchange their respective identities ID(A) and ID(B) in the α-secure KDS, i.e., the identities that were used to generate their respective keying material shares.

Step ii—pairwise key generation: both parties A and B agree on a common key in a distributed way as previously described.

Step iii—authentication handshake: Both parties launch an authentication handshake, e.g., challenge-response handshake, to verify that the generated keys are identical, and thus, both parties own a valid KM share for the α-secure security domain.

Step iv—identification: An entity i can request the disclosure of digital identity of the other entity for more precise identification.

Note that selected attributes of the digital identity can be disclosed, identified and authenticated, as the digital certificate is built by means of a Merkle tree and the root of the Merkle tree, ID(i), has been authenticated by means of keying material share KM(i).

Note also that the exchange of this information is secure and confidential in the sense that it can be encrypted and authenticated with a session key derived from the master pairwise key computed in step ii above.

Step v—authorization and access control: An entity's digital certificate can include some access control roles, related to certain access control rules or policies for the entity. Therefore, an entity can use the digital certificate to authenticate its Access control (AC) roles, enabling in this manner distributed access control. In the next section we give further information about this approach.

Distributed Access Control based on α-secure Digital Certificates

An α-secure digital certificate can be used to store Access Control (AC) roles as addressed in previous sections. By means of the access control roles, a radio station may specify its access properties for accessing data on the other nodes. These AC roles can be efficiently authenticated by means of α-secure KM shares. Therefore, the system that has been described in this disclosure so far can be used to enable distributed access control by taking into account the following issues:

The TC must include the AC roles of an entity in the entity's α-secure digital certificate. This is done during the setup phase, i.e., when entities are registered in the α-secure security domain. In general, distributed AC roles depend upon the entities' digital identities and are related to the AC policies in the security domain. The AC policy specifies which actions (e.g. conditional/unconditional reading, writing, modifying of given parameters) are allowed to be carried out by, e.g., which roles. The TC must thus distribute to each entity during registration the corresponding AC policies/rules (as those are not included in the lightweight (privacy-aware) α-secure digital certificate).

During the operational phase (see FIG. 5) and after identity exchange, key agreement and authentication, the entity holding the AC policies, i, sends a request for the AC roles associated to the other entity, j. Entity i authenticates the validity of j's AC roles by means of the digital certificate. Further commands from j will be either accepted or rejected by i according to the AC policy node i carries, the roles that j owns, and the commands to be executed.

Combining the Lightweight Digital Certificates with other public-key systems

In these embodiments were described two different types of lightweight digital certificates to be used in combination with α-secure KDSs as well as a general approach to enable distributed access control based on these digital certificates and α-secure KDSs. Some of these ideas for distributed AC and privacy aware identification can be used with other key management or identification systems, e.g., based on public key. A concrete application is the use of the LDC in identity based cryptosystems, IBC.

Identity based cryptosystems, IBC, are based on public-key cryptography (PKC). In these PKC-based IBCs, the public key of an entity is derived from one public attribute of the entity's digital identity, e.g., the email address. Given an entity's attribute, any party in an IBC system can generate the corresponding entity's public key from that attribute and send an encrypted message to the other party in a secure way. The entity's private key can only be generated by a key generation center or trust center that transmits it via a secure channel to the involved entity. This kind of IBC has the inherent advantage that the entities' public keys can be generated from one of the attributes that constitute the entities' digital identities; however, it also is its disadvantage. On the one hand, the entities' private keys must be generated by a TC and sent via a secure channel to the entities. On the other hand, further digital certificates might be required to authenticate the rest of attributes of an entity.

The lightweight (privacy-aware) α-secure digital certificate described in the above embodiments can be applied to improve this system (authentication of all attributes of entity's digital identity). To this end, the public key of an entity in a PKC-based IBC can be generated from the whole digital identity of an entity, AC roles or rules that might need to be verified as well as other parameters. The public key for an entity is therefore generated from the entity's identifier, IDentity that depends on the whole digital identity of an entity. IDentity can be (i) the hash of all the digital identity's attributes, or (ii) the root of the Merkle tree built by taking as the Merkle tree's leaves the discrete attributes of an entity's digital entity.

As an example, it is possible that an entity has registered a key generation center. The KGC has assigned to the entity a lightweight privacy-aware digital certificate (LPADC) with root IDentity, as well as the corresponding private key that is linked to that IDentity. So far is the system operation identical to the common IBCs. However, the use of LPADC adds several advantages. To illustrate them assume that entity A sends an e-mail to B in order to supply with some required information. B is a health insurance company and needs some information about the customer A, namely name, age, and last name of the last health insurance company. A sends the email by: its information encrypted with B's public key and signed with its own private key, i.e., A's private key. The content of the email includes the path in the LPADC's Merkle Tree that authenticates the required parameters. One of these parameters is the email address so that B can authenticate this, and be sure that entity A is the owner of the provided set of parameters. Additionally, B can use the IDentity-A to generate A's public key and check the validity of A's signature.

The use of this approach allows for inherent identification and authentication of the whole digital entity without requiring expensive certificates based on public key, and thus, improving the computational performance of theses systems. Besides, the use of the digital certificate based on a Merkle tree allows for discrete disclosure of attributes of an entity's digital entity.

While the invention has been illustrated and described in detail in the drawings and foregoing description, such illustration and description are to be considered illustrative or exemplary and not restrictive; the invention is not limited to the disclosed embodiments.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The techniques described in this invention can find application in very different application areas including:

Security systems for wireless sensor networks based on α-secure key distribution schemes, especially for:

Applications such as Medical sensor networks used for pervasive patient monitoring, or smart environments, such as distributed lighting/building automation/building management systems, where access control policies must be observed.

Wireless sensor networks based on IEEE 802.15.4/ZigBee where α-secure key distribution schemes are being standardized and access control solutions are required.

Identity-based cryptosystems based on public key cryptography or α-secure KDSs.

The invention claimed is:

1. An method for authorizing communication between two nodes within a node network, the method, operable in each node of the network, comprising:
   receiving from a third party source, a keying material share associated with the node, an identity of the node and a digital identity of the node, wherein the keying material share is associated with the digital identity of the node and a base key material;
   receiving a digital identity associated with another node in the network;
   determining an identity of the another node from the received digital identity;
   determining a common key based on the determined identity and the received keying material share;
   initiating, with the another node, an authentication handshake with regard to the determined common key;
   receiving an acknowledgment, from the another node, of an agreement of the determined common key; and
   generating a session key based on the determined common key.

2. The method of claim 1, wherein the digital identity of the node is provided to the third party source.

3. The method of claim 2, wherein the identity of the node is based on a hash of the digital identity of the node.

4. The method of claim 1, wherein the digital identity comprises:
   a set of identity parameters representing at least one attribute of the node.

5. The method of claim 4, wherein the digital identity further comprising:
   a set of access controls to which the node is subjected to.

6. The method of claim 5, wherein the access controls are specific to each of the nodes.

7. The method of claim 4, wherein the determined identity comprises:
   a hash of the received digital identity.

8. The method of claim 1, further comprising:
   establishing a secure channel between communicating nodes based on the respective identities of the communicating nodes.

9. The method of claim 1, wherein the identity of the node-represents a concatenation of a set of identity parameters associated with the node.

10. A node comprising:
    a receiving system configured to:
       receive from a third party source, a keying material share associated with the node, an identity of the node and a digital identity of the node, wherein the keying material share is associated with the digital identity of the node and a base key material;
       receive a digital identity associated with a second node in a network of nodes, wherein said digital identity includes a publicly available attribute of the second node;
    a processor configured to:
       determine an identity of the second node;
       determine a common key based on the determined identity and the keying material share;
       transmit, through a transmitting system, to the second node, an authentication handshake with regard to the determined common key;
       receive, through the receiving system, an acknowledgment, from the second node, of an agreement with the common key;
       generate a session key based on the determined common key; and
       establish a secure communication channel with the second node using the session key.

11. The node of claim 10, wherein the processor is configured to:
    transmit the digital identity of the node to the third party.

12. The node of claim 10:
    wherein the identity of the node is based on a hash of the digital identity of the node.

13. The node of claim 10, wherein the digital identity of the node comprises:
    a set of identity parameters representing of at least one attribute of the node.

14. The node of claim 13, wherein the received digital identity of the node further comprising:
    a set of access controls to which the node is subjected to.

15. The node of claim 14, wherein the access controls are specific to the node.

16. The node of claim 10, the processor further configured to:
    establish a secure channel between the node and the second node.

* * * * *